(12) United States Patent
Tokuda

(10) Patent No.: US 11,879,791 B2
(45) Date of Patent: Jan. 23, 2024

(54) TEMPERATURE DETECTION CIRCUIT AND MODULE

(71) Applicant: Murata Manufacturing Co., Ltd., Kyoto (JP)

(72) Inventor: Masamichi Tokuda, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 629 days.

(21) Appl. No.: 16/893,683

(22) Filed: Jun. 5, 2020

(65) Prior Publication Data

US 2020/0386627 A1 Dec. 10, 2020

(30) Foreign Application Priority Data

Jun. 7, 2019 (JP) .................. 2019-106967

(51) Int. Cl.
*G01K 7/20* (2006.01)
*G01K 1/02* (2021.01)
*G01K 3/00* (2006.01)
*G01K 13/00* (2021.01)
*G01K 7/25* (2006.01)
*G05F 1/56* (2006.01)

(52) U.S. Cl.
CPC .............. *G01K 7/20* (2013.01); *G01K 1/02* (2013.01); *G01K 3/005* (2013.01); *G01K 7/25* (2013.01); *G01K 13/00* (2013.01); *G05F 1/56* (2013.01)

(58) Field of Classification Search
CPC ............ G01K 7/20; G01K 1/02; G01K 3/005; G01K 13/00; G01K 7/25; G05F 1/56
See application file for complete search history.

(56) References Cited

U.S. PATENT DOCUMENTS

| 5,262,758 A | * | 11/1993 | Nam | .................... G08B 21/182 |
| | | | | 374/E1.002 |
| 6,169,442 B1 | * | 1/2001 | Meehan | .............. G06F 11/3058 |
| | | | | 327/512 |
| 2005/0099752 A1 | * | 5/2005 | Liepold | .................. G01K 17/06 |
| | | | | 374/185 |

(Continued)

FOREIGN PATENT DOCUMENTS

| CN | 1721846 A | 1/2006 |
| CN | 106017730 A | * 10/2016 ............. G01K 13/00 |

(Continued)

OTHER PUBLICATIONS

Translation of JP2003084728 (Year: 2003).*
Translation of JP2009276310 (Year: 2008).*

*Primary Examiner* — Nathaniel T Woodward
*Assistant Examiner* — Philip L Cotey
(74) *Attorney, Agent, or Firm* — Pearne & Gordon LLP

(57) ABSTRACT

A temperature detection circuit includes a first temperature sensor unit that includes a temperature sensor configured to detect a temperature of a target object and that is configured to output a first analog signal indicating the detected temperature, a second temperature sensor unit that includes a temperature sensor configured to detect a temperature of the target object and that is configured to output a second analog signal indicating the detected temperature, and an AD converter configured to convert the second analog signal into a digital signal and configured to output the digital signal.

20 Claims, 5 Drawing Sheets

(56) References Cited

U.S. PATENT DOCUMENTS

| | | | | |
|---|---|---|---|---|
| 2006/0010967 A1* | 1/2006 | Matsuo | G01N 25/56 | |
| | | | 73/73 | |
| 2008/0198898 A1* | 8/2008 | Taylor | G01K 7/20 | |
| | | | 374/E7.018 | |
| 2013/0076381 A1* | 3/2013 | Takayanagi | G01K 3/005 | |
| | | | 374/1 | |
| 2013/0169347 A1* | 7/2013 | Kim | G06F 1/206 | |
| | | | 327/513 | |
| 2015/0066438 A1* | 3/2015 | Brooks | H05B 47/28 | |
| | | | 702/191 | |
| 2016/0291653 A1* | 10/2016 | Vootukuru | G01K 7/427 | |
| 2017/0038263 A1* | 2/2017 | Fury | G01K 3/10 | |
| 2017/0227409 A1* | 8/2017 | Wadhwa | G01K 13/00 | |
| 2018/0259985 A1* | 9/2018 | Im | G05D 23/1931 | |
| 2019/0250043 A1* | 8/2019 | Wu | G01K 3/005 | |
| 2020/0304890 A1* | 9/2020 | Pauletti | H04Q 9/00 | |
| 2021/0172808 A1* | 6/2021 | Poirier | H03M 1/0697 | |

FOREIGN PATENT DOCUMENTS

| | | |
|---|---|---|
| JP | 2003-084728 A | 3/2003 |
| JP | 2009-276310 A | 11/2009 |
| JP | 2013-140979 A | 7/2013 |

* cited by examiner

TEMPERATURE DETECTION CIRCUIT AND MODULE

This application claims priority from Japanese Patent Application No. 2019-106967 filed on Jun. 7, 2019. The content of this application is incorporated herein by reference in its entirety.

BACKGROUND OF THE DISCLOSURE

1. Field of the Disclosure

The present disclosure relates to a temperature detection circuit and a module.

2. Description of the Related Art

Japanese Unexamined Patent Application Publication No. 2009-276310 discloses a fluid detection device including a flow sensor including a temperature sensor. In the fluid detection device disclosed in Japanese Unexamined Patent Application Publication No. 2009-276310, an analog signal corresponding to a temperature and a digital signal obtained by converting the analog signal by an analog-to-digital (AD) converter are outputted.

An AD converter typically includes a sample-and-hold circuit for sampling and holding a potential of an analog signal. The sample-and-hold circuit includes a capacitor for accumulating charge corresponding to the potential of the analog signal, and a switch for switching whether to accumulate charge in the capacitor, by a short-circuit operation and an opening operation.

The fluid detection device disclosed in Japanese Unexamined Patent Application Publication No. 2009-276310 has a problem that when the switch in the AD converter is switched from the opening operation to the short-circuit operation, charge accumulated in the capacitor leaks to a side of the temperature sensor, and thus an output potential of the temperature sensor fluctuates. That is, since noise is mixed in the analog signal outputted from the temperature sensor, it becomes impossible to detect the temperature with high accuracy.

BRIEF SUMMARY OF THE DISCLOSURE

Therefore, an object of the present disclosure is to provide a temperature detection circuit capable of detecting a temperature with high accuracy, and a module including the temperature detection circuit.

A temperature detection circuit according to an aspect of the present disclosure includes a first temperature sensor unit that includes a first temperature sensor configured to detect a temperature of a target object and that is configured to output a first analog signal indicating a detected temperature, a second temperature sensor unit that includes a second temperature sensor configured to detect a temperature of the target object and that is configured to output a second analog signal indicating a detected temperature, and an AD converter configured to convert the second analog signal into a digital signal and configured to output the digital signal.

A module according to an aspect of the present disclosure includes the temperature detection circuit and a power supply circuit configured to supply a constant voltage to the temperature detection circuit.

Other features, elements, characteristics and advantages of the present disclosure will become more apparent from the following detailed description of preferred embodiments of the present disclosure with reference to the attached drawings.

DETAILED DESCRIPTION OF THE DISCLOSURE

Hereinafter, a temperature detection circuit and a module according to an embodiment of the present disclosure will be described in detail with reference to the drawings. Note that the embodiment to be described below illustrates one specific example of the present disclosure. Therefore, the numerical values, the shapes, the materials, the constituent elements, the arrangement and connection forms of the constituent elements, the steps, the order of the steps, and the like shown in the following embodiment are mere examples, and are not intended to limit the present disclosure. Therefore, among the constituent elements in the following embodiment, the constituent elements that are not described in the independent claims will be described as arbitrary constituent elements.

In addition, the respective drawings are schematic views and are not necessarily exactly drawn. Therefore, for example, the scales and the like do not necessarily match in the respective drawings. Also, in the respective drawings, substantially the same configurations are denoted by the same reference signs, and redundant description will be omitted or simplified.

In addition, in the present specification, the term "connect" or "connection" refers to a state in which two or more objects or parts of objects are connected to each other directly or indirectly with one or more objects interposed therebetween. Note that the term "object" refers to, for example, a component, a member, or an electric circuit element.

Embodiment

1. SUMMARY

Figure 1:
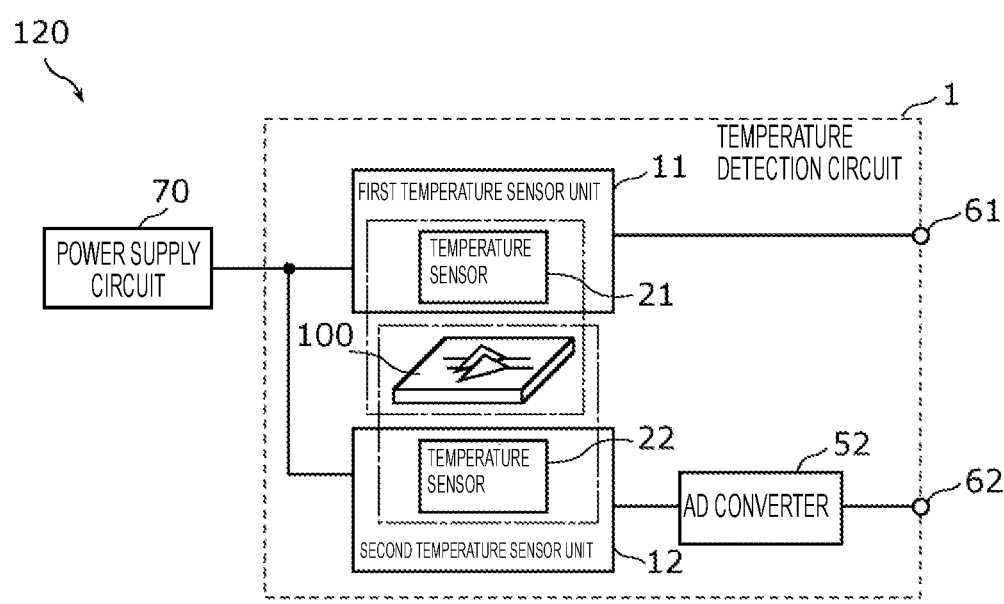
FIG. 1 is a block diagram illustrating a configuration of an IC element including a temperature detection circuit according to an embodiment.

First, a summary of a temperature detection circuit according to the embodiment and an integrated circuit (IC) element including the temperature detection circuit will be described with reference to FIG. 1. FIG. 1 is a block diagram illustrating a configuration of an IC element 120 including a temperature detection circuit 1 according to the present embodiment.

As illustrated in FIG. 1, the IC element 120 includes the temperature detection circuit 1 and a power supply circuit 70. Although the details will be described later, the IC element 120 is an IC element for a transmission/reception module 100. Note that, in FIG. 1, for convenience of illustration, the transmission/reception module 100 is schematically illustrated as being included in the temperature detection circuit 1, but in the present embodiment, the IC element 120 is provided in the transmission/reception module 100. Note that the power supply circuit 70 may be formed outside the IC element 120.

The temperature detection circuit 1 operates with a constant voltage supplied from the power supply circuit 70, and detects a temperature of a target object. The target object is, for example, the transmission/reception module 100. Specifically, the target object is a power amplifier (PA) or a low-noise amplifier (LNA) included in the transmission/reception module 100. In addition, the constant voltage is a voltage sufficiently stabilized in such a degree that a voltage value can be regarded as being substantially constant.

As illustrated in FIG. 1, the temperature detection circuit 1 includes a first temperature sensor unit 11, a second temperature sensor unit 12, and an AD converter 52. Further, the temperature detection circuit 1 includes a first output terminal 61 and a second output terminal 62.

The first temperature sensor unit 11 includes a temperature sensor 21 configured to detect a temperature of the target object, and outputs a first analog signal indicating the detected temperature. The first analog signal is outputted to the outside of the temperature detection circuit 1 via the first output terminal 61.

The second temperature sensor unit 12 includes a temperature sensor 22 configured to detect a temperature of the target object, and outputs a second analog signal indicating the detected temperature. The second analog signal is outputted to the AD converter 52.

The AD converter 52 converts the second analog signal into a digital signal and outputs the digital signal. The converted digital signal is outputted to the outside of the temperature detection circuit 1 via the second output terminal 62.

The first output terminal 61 is a terminal for outputting the first analog signal indicating a temperature detected by the first temperature sensor unit 11. The first output terminal 61 is connected to, for example, another circuit component in the transmission/reception module 100, or a module or an IC element different from the transmission/reception module 100, and outputs the first analog signal to the circuit component, the module, the IC element, or the like that is a connection destination.

The second output terminal 62 is connected to an output terminal of the AD converter 52. The second output terminal 62 is a terminal for outputting a digital signal obtained by converting the second analog signal indicating a temperature detected by the second temperature sensor unit 12. The second output terminal 62 is connected to, for example, another circuit component in the transmission/reception module 100, or a module or an IC element different from the transmission/reception module 100, and outputs the digital signal to the circuit component, the module, the IC element, or the like that is a connection destination.

As described above, the temperature detection circuit 1 according to the present embodiment includes the two temperature sensors 21 and 22, and outputs the analog signal and the digital signal indicating the detection results of the temperature of the target object. Specifically, the temperature sensor 21 is used for outputting an analog signal, and the temperature sensor 22 is used for outputting a digital signal. That is, the temperature detection circuit 1 includes the two temperature sensors 21 and 22 independent of each other in order to detect a temperature of the same target object. In other words, the target object is thermally coupled to the temperature sensor 21 and is thermally coupled to the temperature sensor 22.

2. Configuration

Figure 2:
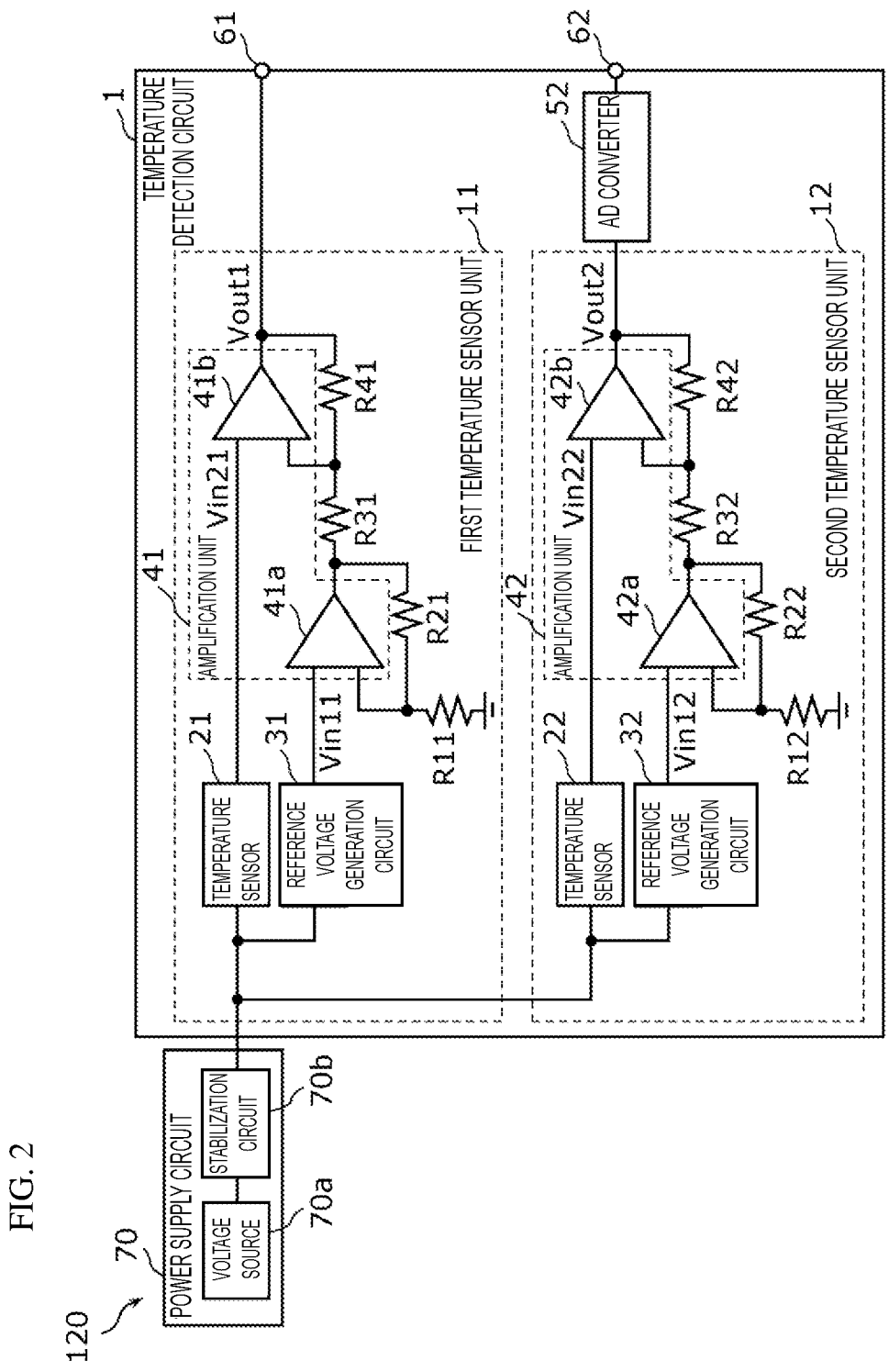
FIG. 2 is a block diagram illustrating a specific configuration of the IC element including the temperature detection circuit according to the embodiment.

Next, a more specific configuration of the IC element 120 will be described with reference to FIG. 2. FIG. 2 is a block diagram illustrating the specific configuration of the IC element 120 including the temperature detection circuit 1 according to the present embodiment. Specifically, FIG. 2 illustrates an example of the specific configuration of the first temperature sensor unit 11, the second temperature sensor unit 12, and the power supply circuit 70.

2-1. First Temperature Sensor Unit (for Analog Output)

As illustrated in FIG. 2, the first temperature sensor unit 11 includes the temperature sensor 21, a reference voltage generation circuit 31, an amplification unit 41, and resistances R11, R21, R31, and R41 that are examples of a first resistance.

The temperature sensor 21 is an example of a first temperature sensor configured to detect a temperature of the target object and configured to output a first temperature signal indicating the detected temperature. As illustrated in FIG. 1, the temperature sensor 21 is thermally coupled to the target object. In FIG. 1, the thermal coupling is represented by a dashed-dotted line. Specifically, the temperature sensor 21 is thermally coupled to an RF amplifier unit 126 or a PA unit 132 (see FIG. 5) included in the transmission/reception module 100.

The temperature sensor 21 includes, for example, a diode or a diode-connected transistor. Since the diode or the transistor has high affinity to forming of an integrated circuit, the temperature sensor 21 can be easily formed in the IC element 120. Alternatively, the temperature sensor 21 may be a thermistor. The temperature sensor 21 is not particularly limited as long as the temperature sensor 21 is configured to detect a temperature of the target object and is configured to output an analog signal indicating the detected temperature. For example, the temperature sensor 21 may be a sensor using a band gap reference (BGR) circuit. The same applies to the temperature sensor 22.

The first temperature signal outputted from the temperature sensor 21 is, for example, a voltage signal. A signal level of the first temperature signal, that is, a voltage value, has a predetermined correlation with a temperature of the target object detected by the temperature sensor 21. For example, the voltage value of the first temperature signal and the temperature of the target object have a proportional relationship with each other. Note that the predetermined correlation may not be a proportional relationship, and may be a relationship represented by a predetermined function, such as a linear function or a quadratic function. The first temperature signal is outputted to the amplification unit 41.

The reference voltage generation circuit 31 is an example of a first reference voltage generation circuit configured to generate a first reference voltage to be supplied to the amplification unit 41. Specifically, the reference voltage generation circuit 31 generates the first reference voltage based on the constant voltage supplied from the power supply circuit 70, and supplies the generated first reference voltage to an amplifier 41a of the amplification unit 41.

The amplification unit 41 is an example of a first amplification unit configured to amplify the first temperature signal outputted from the temperature sensor 21, and configured to output the amplified first temperature signal as the first analog signal. The amplification unit 41 includes two amplifiers 41a and 41b. Each of the amplifiers 41a and 41b is, for example, an operational amplifier. A first reference voltage Vin11 generated by the reference voltage generation circuit 31 is inputted to the amplifier 41a. A voltage Vin21 of the first temperature signal indicating the temperature detected by the temperature sensor 21 is inputted to the amplifier 41b.

An output terminal of the reference voltage generation circuit 31 is connected to a non-inverting input terminal (+) of the amplifier 41a, and the first reference voltage Vin11 generated by the reference voltage generation circuit 31 is inputted to the non-inverting input terminal (+). An inverting input terminal (−) of the amplifier 41a is connected to a ground with the resistance R11 interposed therebetween. The inverting input terminal and an output terminal of the amplifier 41a are connected to each other with the resistance R21 interposed therebetween. The output terminal of the amplifier 41a is connected to an inverting input terminal of the amplifier 41b with the resistance R31 interposed therebetween.

An output terminal of the temperature sensor 21 is connected to a non-inverting input terminal (+) of the amplifier 41b, and the voltage Vin21 of the first temperature signal is inputted to the non-inverting input terminal (+). The inverting input terminal (−) of the amplifier 41b is connected to the output terminal of the amplifier 41a with the resistance R31 interposed therebetween. That is, the inverting input terminal of the amplifier 41b is connected to the ground with the resistances R31, R21, and R11 interposed therebetween. The inverting input terminal and an output terminal of the amplifier 41b are connected to each other with the resistance R41 interposed therebetween. The output terminal of the amplifier 41b is connected to the first output terminal 61 of the temperature detection circuit 1, and the first analog signal is outputted.

According to such a connection relationship, an output voltage Vout1 of the first analog signal outputted from the first temperature sensor unit 11 is expressed by the following equation (1).

$$Vout1 = \left(1 + \frac{R41}{R31}\right)Vin21 - \frac{R41}{R31}\left(1 + \frac{R21}{R11}\right)Vin11 \quad (1)$$

That is, the output voltage Vout1 is represented by a linear function of the voltage Vin21 indicating the temperature detected by the temperature sensor 21. A slope of the output voltage Vout1 can be adjusted by adjusting the values of the resistances R31 and R41. Further, an intercept of the output voltage Vout1 can be adjusted by adjusting the first reference voltage Vin11 to be generated by the reference voltage generation circuit 31 and the resistance values of the resistances R11, R21, R31, and R41. As described above, by adjusting the first reference voltage Vin11 and the resistance values of the resistances R11, R21, R31, and R41, it is possible to implement the temperature sensor unit having the desired temperature characteristics.

Note that the connection relationship between the constituent elements is not limited to the example illustrated in FIG. 2. The first temperature sensor unit 11 may include the temperature sensor 21, the reference voltage generation circuit 31, at least one amplifier (for example, an operational amplifier), and at least one resistance. That is, the number of amplifiers included in the first temperature sensor unit 11 may be only one, and the number of resistances included in the first temperature sensor unit 11 may be only one.

2-2. Second Temperature Sensor Unit (for Digital Output)

As illustrated in FIG. 2, the second temperature sensor unit 12 includes the temperature sensor 22, a reference voltage generation circuit 32, an amplification unit 42, and resistances R12, R22, R32, and R42 that are examples of a second resistance.

The temperature sensor 22 is an example of a second temperature sensor configured to detect a temperature of the target object and configured to output a second temperature signal indicating the detected temperature. As illustrated in FIG. 1, the temperature sensor 22 is thermally coupled to the target object. Specifically, the temperature sensor 21 is thermally coupled to the RF amplifier unit 126 or the PA unit 132 (see FIG. 5) included in the transmission/reception module 100.

The temperature sensor 22 has the same configuration as that of the temperature sensor 21, for example. Specifically, a circuit configuration of the temperature sensor 22 is the same as that of the temperature sensor 21. More preferably, the circuit configuration of the temperature sensor 22 and sizes of circuit elements configuring the temperature sensor 22, and the circuit configuration of the temperature sensor 21 and sizes of circuit elements configuring the temperature sensor 21 may be the same. Thereby, it is possible to suppress a difference between detection results due to variation in operation and variation in characteristics between the temperature sensor 21 and the temperature sensor 22. That is, a temperature detected by the temperature sensor 22 and a temperature detected by the temperature sensor 21 are substantially equal to each other. Therefore, a voltage value of the second temperature signal and a voltage value of the first temperature signal are substantially equal to each other.

The reference voltage generation circuit 32 is an example of a second reference voltage generation circuit configured to generate a second reference voltage to be supplied to the amplification unit 42. Specifically, the reference voltage generation circuit 32 generates the second reference voltage based on the constant voltage supplied from the power supply circuit 70, and supplies the generated second reference voltage to an amplifier 42a of the amplification unit 42.

The reference voltage generation circuit 32 has the same configuration as that of the reference voltage generation circuit 31. As a result, the second reference voltage and the first reference voltage are substantially equal to each other.

The amplification unit 42 is an example of a second amplification unit configured to amplify the second temperature signal outputted from the temperature sensor 22 and configured to output the amplified second temperature signal as the second analog signal. The amplification unit 42 includes two amplifiers 42a and 42b. Each of the amplifiers 42a and 42b is, for example, an operational amplifier. A second reference voltage Vin12 generated by the reference voltage generation circuit 32 is inputted to the amplifier 42a.

A voltage Vin22 of the second temperature signal indicating a temperature detected by the temperature sensor 22 is inputted to the amplifier 42b.

The amplifiers 42a and 42b, and the resistances R12, R22, R32, and R42 respectively correspond to the amplifiers 41a and 41b, and the resistances R11, R21, R31, and R41 of the first temperature sensor unit 11, and have the same connection relationship. For this reason, an output voltage Vout2 of the second analog signal outputted from the second temperature sensor unit 12 is expressed by the following equation (2).

$$Vout2 = \left(1 + \frac{R42}{R32}\right)Vin22 - \frac{R42}{R32}\left(1 + \frac{R22}{R12}\right)Vin12 \quad (2)$$

That is, the output voltage Vout2 is represented by a linear function of the voltage Vin22 indicating a temperature detected by the temperature sensor 22. Therefore, as with the first temperature sensor unit 11, the temperature sensor unit having the desired temperature characteristics can be implemented by adjusting the second reference voltage Vin12 and resistance values of the resistances R12, R22, R32, and R42. For example, the second reference voltage Vin12 and the resistance values of the resistances R12, R22, R32, and R42 are equal to the first reference voltage Vin11 and the resistance values of the resistances R11, R21, R31, and R41 of the first temperature sensor unit 11, respectively. Since the voltage Vin22 of the second temperature signal is substantially equal to the voltage Vin21 of the first temperature signal, the output voltage Vout2 of the second analog signal is substantially the same as the output voltage Vout1 of the first analog signal. An output terminal (specifically, an output terminal of the amplifier 42b) of the amplification unit 42 is connected to the AD converter 52.

Note that the connection relationship between the constituent elements is not limited to the example illustrated in FIG. 2. The second temperature sensor unit 12 may include the temperature sensor 22, the reference voltage generation circuit 32, at least one amplifier (for example, an operational amplifier), and at least one resistance. That is, the number of amplifiers included in the second temperature sensor unit 12 may be only one, and the number of resistances included in the second temperature sensor unit 12 may be only one.

The AD converter 52 converts the second analog signal outputted from the amplification unit 42 into a digital signal, and outputs the digital signal. The AD converter 52 includes, for example, a sample-and-hold circuit and a quantization circuit. The sample-and-hold circuit includes a switch element such as a metal oxide semiconductor field effect transistor (MOSFET), and a capacitor for accumulating a potential (charge) of an analog signal indicating a temperature detected by the second temperature sensor unit 12. The quantization circuit converts the charge accumulated in the capacitor into a digital value based on a constant relationship. The output terminal of the AD converter 52 is connected to the second output terminal 62. A digital signal is outputted from the second output terminal 62.

2-3. Power Supply Circuit

The power supply circuit 70 supplies the constant voltage to the temperature detection circuit 1. As illustrated in FIG. 2, the power supply circuit 70 includes a voltage source 70a and a stabilization circuit 70b.

The voltage source 70a is a direct-current voltage source. The voltage source 70a generates and outputs a predetermined voltage based on a voltage stored in a secondary battery or a primary battery included in a communication device, for example.

The stabilization circuit 70b generates a constant voltage by stabilizing a voltage outputted from the voltage source 70a. The stabilization circuit 70b includes, for example, an error amplification unit and a current amplification unit.

The error amplification unit is, for example, a differential amplifier configured by using an operational amplifier. Specifically, the stabilization circuit 70b includes an operational amplifier and two resistances connected in series with each other. For example, an inverting input terminal of the operational amplifier is connected to the voltage source 70a, and a non-inverting input terminal thereof is connected to a connection portion of the two resistances. An output terminal of the operational amplifier is connected to the current amplification unit.

The current amplification unit includes, for example, a transistor connected to an output terminal of the differential amplifier. The transistor is, for example, a MOSFET. The current amplification unit is configured with a common-source circuit of a p-channel MOSFET. Specifically, a gate of the MOSFET is connected to the output terminal of the operational amplifier, a drain thereof is connected to a power supply voltage, and a source thereof is connected to the ground with two resistances interposed therebetween. A connection portion between the source and one of the two resistances is an output terminal of the power supply circuit 70, and is connected to the first temperature sensor unit 11 and the second temperature sensor unit 12. In the present embodiment, the power supply circuit 70 is shared by the first temperature sensor unit 11 and the second temperature sensor unit 12.

With this circuit configuration, it is possible to achieve the required voltage stabilization with a small input/output voltage difference. In particular, in an environment operated by a battery such as in a mobile phone terminal, an output impedance of the battery, that is, an internal resistance, tends to rise easily when the battery approximates a discharge termination voltage. For this reason, at the same time when the output voltage decreases, the power supply voltage easily fluctuates when there is current consumption of a load including noise or an electromotive force of the load. In this case as well, while a stable and smooth output voltage is being maintained, the output voltage can be supplied to the first temperature sensor unit 11 and the second temperature sensor unit 12. Accordingly, the accuracy of temperatures detected by the first temperature sensor unit 11 and the second temperature sensor unit 12 can be improved.

Note that the current amplification unit can obtain the similar effect even when a common-emitter-type current amplification circuit using a pnp-type bipolar transistor is used as the current amplification unit. Additionally, the transistor used in the current amplification unit may be an n-channel MOSFET or an npn-type bipolar transistor.

3. Comparison with Comparative Example and Effects

Next, effects and the like by the temperature detection circuit 1 according to the present embodiment will be described with reference to a comparative example.

Figure 3:
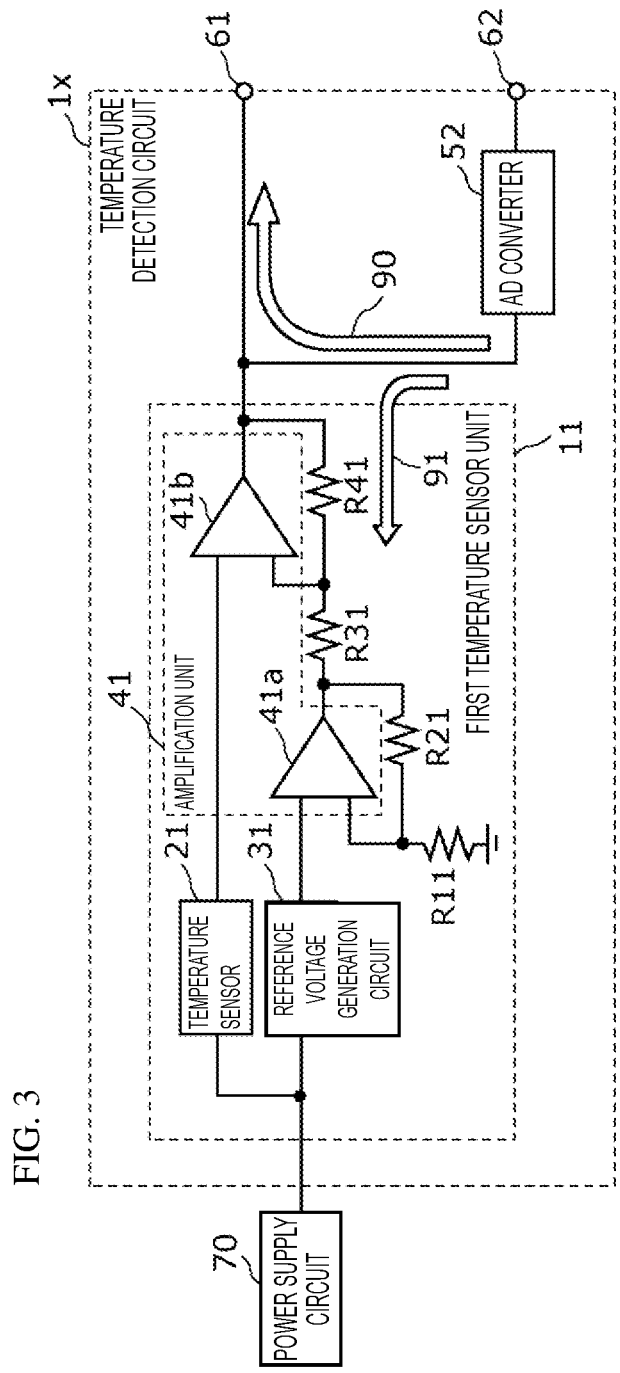
FIG. 3 is a block diagram illustrating a configuration of a temperature detection circuit according to a comparative example.

FIG. 3 is a block diagram illustrating a configuration of a temperature detection circuit 1x according to the comparative example. As illustrated in FIG. 3, the temperature detection circuit 1x according to the comparative example includes the first temperature sensor unit 11 and does not include the second temperature sensor unit 12. That is, the temperature detection circuit 1x does not include the temperature sensor 22.

As with the temperature detection circuit 1 according to the present embodiment, the temperature detection circuit 1x according to the comparative example includes the AD converter 52, the first output terminal 61, and the second output terminal 62. Accordingly, the temperature detection circuit 1x outputs an analog signal indicating a temperature of a target object from the first output terminal 61, and outputs a digital signal indicating the temperature of the target object from the second output terminal 62.

In the temperature detection circuit 1x according to the comparative example, an output terminal of the first temperature sensor unit 11 is connected to the first output terminal 61 and the AD converter 52. That is, an output path of the analog signal outputted from the first temperature sensor unit 11 branches into the first output terminal 61 for an analog output and the second output terminal 62 for a digital output. In other words, in the temperature detection circuit 1x, one temperature sensor 21 is shared for the analog output and the digital output.

In the temperature detection circuit 1x according to the comparative example, an input terminal of the AD converter 52 is connected to the first output terminal 61 for analog. For this reason, as indicated by an arrow 90 in FIG. 3, variation in potential caused by switching of a switching element included in the AD converter 52 is superimposed on the analog signal outputted from the first output terminal 61 as switching noise. Therefore, the analog signal outputted from the first output terminal 61 does not represent the correct temperature of the target object, and thus, when processing is performed by using the analog signal, the reliability of the processing is reduced.

In contrast, the temperature detection circuit 1 according to the present embodiment includes the first temperature sensor unit 11 that includes the temperature sensor 21 configured to detect a temperature of the target object, and that is configured to output the first analog signal indicating the detected temperature, the second temperature sensor unit 12 that includes the temperature sensor 22 configured to detect a temperature of the same target object, and that is configured to output the second analog signal indicating the detected temperature, and the AD converter 52 configured to convert the second analog signal into a digital signal and configured to output the digital signal.

As described above, the temperature detection circuit 1 includes the two temperature sensors 21 and 22, and outputs an analog signal and a digital signal indicating detection results of the temperature of the target object. That is, the temperature detection circuit 1 includes the two temperature sensors 21 and 22 independent of each other, despite detecting the temperature of the same target object. In the temperature detection circuit 1, a sensor system including the temperature sensor 21 for outputting an analog signal and a sensor system including the temperature sensor 22 for outputting a digital signal are separated from each other. Accordingly, it is possible to prevent the switching noise caused by the AD converter 52 connected to the temperature sensor 22 from being superimposed on an output signal of the temperature sensor 21. That is, in the first analog signal outputted from the first temperature sensor unit 11, it is possible to maintain a stable and clean output voltage with little noise superimposed. Therefore, according to the temperature detection circuit 1, it is possible to detect a temperature with high accuracy.

As described above, the temperature detection circuit 1 can detect a temperature of the target object with high accuracy. Other IC elements or other devices that use the analog signal and the digital signal outputted from the temperature detection circuit 1 may perform determination and processing with high reliability.

Further, for example, the first temperature sensor unit 11 further includes the amplification unit 41 configured to amplify a signal outputted from the temperature sensor 21 and configured to output the amplified signal as the first analog signal, the reference voltage generation circuit 31 configured to generate the first reference voltage to be supplied to the amplification unit 41, and at least one of the resistances R11, R21, R31, and R41 that is an example of the first resistance connected to the amplification unit 41. The second temperature sensor unit 12 further includes the amplification unit 42 configured to amplify a signal outputted from the temperature sensor 22 and configured to output the amplified signal to the AD converter 52 as the second analog signal, the reference voltage generation circuit 32 configured to generate the second reference voltage to be supplied to the amplification unit 42, and at least one of the resistances R12, R22, R32, and R42 that is an example of the second resistance connected to the amplification unit 42.

Accordingly, it is possible to set a slope and an intercept of change in output voltage Vout of the first analog signal outputted from the first temperature sensor unit 11 with respect to the detected temperature, to a desired value. Therefore, it is possible to increase a degree of freedom in design of temperature characteristics of the output voltage Vout. The same applies to the output voltage Vout of the second analog signal outputted from the second temperature sensor unit 12. Therefore, it is possible to achieve appropriate temperature measurement in response to characteristics of temperature change of the target object, and the like.

4. Transmission/Reception Module

The temperature detection circuit 1 according to the present embodiment can be applied to various devices. Hereinafter, an example in which the temperature detection circuit 1 is provided in the IC element 120 of the transmission/reception module 100 of the communication device will be described.

4-1. Mechanical Structure of Transmission/Reception Module

Figure 4:
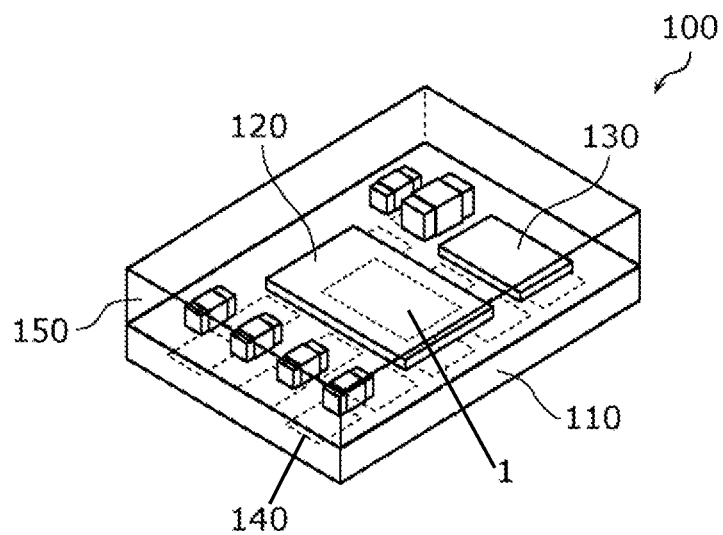
FIG. 4 is a perspective view of a transmission/reception module including the temperature detection circuit according to the embodiment.

First, a mechanical configuration of the transmission/reception module 100 will be described with reference to FIG. 4. FIG. 4 is a perspective view illustrating the transmission/reception module 100 including the temperature detection circuit 1 according to the present embodiment.

As illustrated in FIG. 4, the transmission/reception module 100 includes a substrate 110, the IC element 120, an IC element 130, a plurality of terminals 140, and a sealing resin 150. In addition, although not illustrated, the transmission/reception module 100 may include a metal member for electromagnetic shielding (shield) provided so as to cover a surface of the sealing resin 150.

The substrate 110 is a mounting substrate on which the IC elements 120 and 130, other circuit components, and the like are mounted. For example, the substrate 110 is a substrate using a glass epoxy-based or bismaleimide-triazine (BT)

resin-based resin material. Note that the material of the substrate 110 is not particularly limited, and a ceramic substrate such as a low temperature co-fired ceramic (LTCC) substrate, a printed circuit board (PCB) substrate, a semiconductor substrate, or the like may be used.

The IC elements 120 and 130 are mounted on a surface of the substrate 110 with solder bumps interposed therebetween, for example. The IC element 120 includes the temperature detection circuit 1. The IC element 130 includes a power amplifier. A specific functional configuration of the IC elements 120 and 130 will be described later with reference to FIG. 5. Further, a passive element such as a surface-mount type (SMD type) inductor or capacitor for impedance matching is mounted on the surface of the substrate 110 by, for example, reflow soldering. Note that a mounting method of each component is not particularly limited. Further, for example, the IC elements 120 and 130 may be provided so as to be embedded in the substrate 110. Further, the passive element such as an inductor or a capacitor may be formed by using metal wiring in the substrate 110.

The plurality of terminals 140 include an input/output terminal, a control terminal, a power supply terminal of the transmission/reception module 100, and the like. The plurality of terminals 140 is provided on a rear surface of the substrate 110 (on a side opposite to the surface on which the IC element 120 is mounted), and is electrically connected to the IC element 120 and the like with through electrodes penetrating the substrate 110 interposed therebetween.

The sealing resin 150 is resin that seals the IC elements 120 and 130, and other circuit components. The sealing resin 150 is, for example, epoxy-based resin, but the present disclosure is not limited thereto. For example, the sealing resin 150 for sealing each component is formed by transfer molding of each component mounted on the surface of the substrate 110 by using the epoxy-based resin. This achieves the mechanical integration of the transmission/reception module 100 and the stabilization of electrical connection thereof.

An upper surface (a main surface opposite to the substrate 110) of the sealing resin 150 and four side surfaces are covered with a metal member (not illustrated) for shielding. The metal member includes one or a plurality of metal films formed by sputtering, plating, or the like. Each of the one or the plurality of metal films is formed using, for example, copper, aluminum, nickel, titanium or tantalum, or an alloy thereof. The metal member is connected to a ground electrode at an end face of the substrate 110.

4-2. Functional Configuration of Transmission/Reception Module

Figure 5:
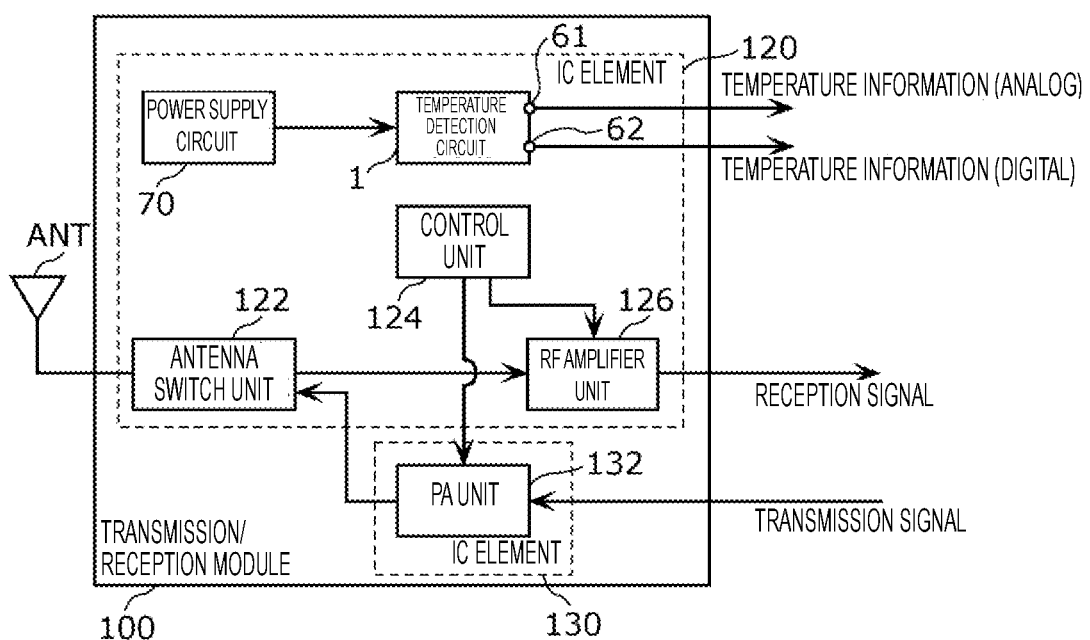
FIG. 5 is a block diagram of the transmission/reception module according to the embodiment.

Next, a specific functional configuration of the transmission/reception module 100 will be described with reference to FIG. 5. FIG. 5 is a block diagram illustrating the configuration of the transmission/reception module 100 according to the present embodiment.

4-2-1. Transmission/Reception Module

The transmission/reception module 100 is a module that is connected to an antenna ANT, and that performs processing such as amplification of a transmission signal, amplification of a reception signal, and switching and sharing of the antenna ANT. Specifically, as illustrated in FIG. 5, the transmission/reception module 100 includes the IC element 120 and the IC element 130.

The IC element 120 is an example of a first IC element included in the transmission/reception module 100. As illustrated in FIG. 5, the IC element 120 includes the temperature detection circuit 1, the power supply circuit 70, an antenna switch unit 122, a control unit 124, and the RF amplifier unit 126 for reception. Specifically, the temperature detection circuit 1, the power supply circuit 70, the antenna switch unit 122, the control unit 124, and the RF amplifier unit 126 for reception are integrated on one die of the IC element 120.

The antenna switch unit 122 is connected to the antenna ANT. Specifically, the antenna switch unit 122 has at least one antenna port, and transfers and accepts signals to and from the antenna ANT connected to the antenna port.

The control unit 124 controls an operation of the transmission/reception module 100.

The RF amplifier unit 126 amplifies a reception signal and outputs the amplified reception signal. Specifically, the RF amplifier unit 126 is a low-noise amplifier (LNA) connected to the antenna switch unit 122 and configured to amplify a reception signal received by the antenna ANT.

The IC element 130 is an example of a second IC element included in the transmission/reception module 100. As illustrated in FIG. 5, the IC element 130 includes the PA unit 132 for transmission.

The PA unit 132 is an example of an amplifier connected to the antenna switch unit 122, and configured to amplify a transmission signal to be transmitted by the antenna ANT. Specifically, the PA unit 132 amplifies a transmission signal to be transmitted by the antenna ANT, and outputs the amplified transmission signal to the antenna switch unit 122.

4-3. Effects, etc.

As described above, the transmission/reception module 100 according to the present embodiment includes the temperature detection circuit 1 and the power supply circuit 70 configured to supply the constant voltage to the temperature detection circuit 1.

Accordingly, the transmission/reception module 100 includes the temperature detection circuit 1, and thus, it is possible to output the first analog signal and the digital signal indicating a temperature detected with high accuracy to the outside. Since the accuracy of the detected temperature is high, the accuracy of determination processing using the temperature is also increased. Therefore, for example, it is possible to stably perform the control of the transmission/reception module 100. Further, since the power supply circuit 70 that supplies an operation voltage to the temperature sensors 21 and 22 can be shared, the circuit scale and size can be reduced.

Further, for example, the power supply circuit 70 includes the voltage source 70a, and the stabilization circuit 70b configured to generate the constant voltage by stabilizing a voltage outputted from the voltage source 70a.

Accordingly, it is possible to maintain a stable and smooth output voltage and to supply the output voltage to the first temperature sensor unit 11 and the second temperature sensor unit 12. Therefore, the accuracy of temperatures detected by the first temperature sensor unit 11 and the second temperature sensor unit 12 can be improved.

Further, for example, the transmission/reception module 100 further includes the IC element 120, and the temperature detection circuit 1 is provided in the IC element 120.

Accordingly, since the temperature detection circuit 1 is provided in the one IC element 120, the two temperature sensors 21 and 22 can perform stronger thermal coupling to the target object included in the IC element 120. Therefore, a difference between temperature detection results obtained by the two temperature sensors 21 and 22 becomes sufficiently small, and two output signals having the same detection result can be outputted. Further, since the temperature detection circuit 1 is provided in the IC element 120, it is possible to achieve high integration of the IC element 120 and reduction in size of the transmission/reception module 100.

Further, for example, the IC element 120 further includes the antenna switch unit 122 connected to the antenna ANT, and a low-noise amplifier (RF amplifier unit 126) connected to the antenna switch unit 122 and configured to amplify a reception signal received by the antenna ANT.

Because of this, since the low-noise amplifier (specifically, the RF amplifier unit 126) that is a heat source and the temperature sensors 21 and 22 are provided in the same IC element 120, a thermal resistance between the RF amplifier unit 126 and each of the temperature sensors 21 and 22 is reduced. For this reason, a temperature rising rate and a temperature dropping rate of each of the temperature sensors 21 and 22 are increased. As a result, it is possible to perform temperature measurement exhibiting good response, and it is possible to detect a temperature of the RF amplifier unit 126 with high accuracy.

Further, for example, since each of the temperature sensors 21 and 22 is thermally coupled to the RF amplifier unit 126, the influence of temperature noise such as an unnecessary external heat source can be relatively reduced. As a result, it is possible to perform temperature measurement exhibiting a good S/N, and it is possible to detect a temperature of the RF amplifier unit 126 with high accuracy.

Further, for example, the transmission/reception module 100 further includes an amplifier (PA unit 132) connected to the antenna switch unit 122 and configured to amplify a transmission signal to be transmitted by the antenna ANT.

Accordingly, a temperature of the PA unit 132 can be detected with high accuracy.

Further, for example, the transmission/reception module 100 further includes the IC element 130, and the PA unit 132 is provided in the IC element 130.

In this case, for example, as illustrated in FIG. 4, the respective components are mounted on the substrate 110, and then transfer molding is performed, so that it is possible to increase a degree of thermal coupling between the IC element 120 and the IC element 130 for the PA unit 132 which are separated from each other as semiconductor chips, together with the integration of mechanical structures. Accordingly, the degree of the thermal coupling between each of the temperature sensors 21 and 22 and the PA unit 132 increases, and thus it is possible to relatively reduce the influence of the temperature noise such as an unnecessary external heat source. As a result, it is possible to perform temperature measurement exhibiting a good S/N, and it is possible to detect a temperature of the PA unit 132 with high accuracy.

Further, a thermal resistance between the PA unit 132 that is a heat source and each of the temperature sensors 21 and 22 is reduced, and thus a temperature rising rate and a temperature dropping rate of each of the temperature sensors 21 and 22 are increased. As a result, it is possible to perform temperature measurement exhibiting good response, and it is possible to detect a temperature of the PA unit 132 with high accuracy.

Modifications

Note that the switching noise caused by the AD converter 52 may return to the power supply circuit 70 via the amplification unit 41 and the reference voltage generation circuit 31, as indicated by an arrow 91 in FIG. 3. Therefore, when the power supply circuit 70 is shared by the first temperature sensor unit 11 and the second temperature sensor unit 12, there is a possibility that the switching noise affects a detection result of the first temperature sensor unit 11 via the power supply circuit 70.

Hereinafter, description will be given of modifications of the power supply circuit for suppressing the switching noise sneaking via the power supply circuit 70. In an IC element according to the present modification, a configuration of the power supply circuit 70 is different from that of the IC element 120 according to the embodiment. Hereinafter, differences from the embodiment will be mainly described, and description of common points will be omitted or simplified.

First Modification

Figure 6:
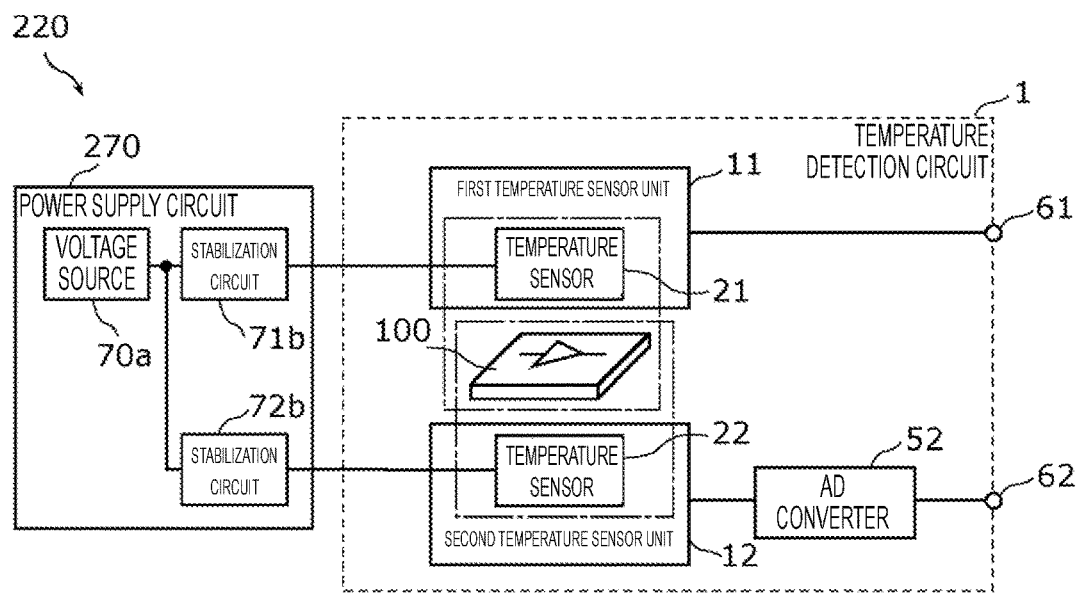
FIG. 6 is a block diagram illustrating a specific configuration of an IC element according to a first modification of the embodiment.

First, an IC element according to a first modification will be described with reference to FIG. 6. FIG. 6 is a block diagram illustrating a specific configuration of an IC element 220 according to the present modification.

As illustrated in FIG. 6, the IC element 220 includes a power supply circuit 270 instead of the power supply circuit 70, as compared with the IC element 120 according to the embodiment. The power supply circuit 270 includes two stabilization circuits 71b and 72b instead of the stabilization circuit 70b.

The two stabilization circuits 71b and 72b have the same configuration as that of the stabilization circuit 70b according to the embodiment, and each of the stabilization circuits 71b and 72b generates a constant voltage. The constant voltage generated by the stabilization circuit 71b and the constant voltage generated by the stabilization circuit 72b have the same magnitude. The stabilization circuit 71b supplies the generated constant voltage to the temperature sensor 21 of the first temperature sensor unit 11. The stabilization circuit 72b supplies the generated constant voltage to the temperature sensor 22 of the second temperature sensor unit 12.

As described above, in the transmission/reception module according to the present modification, the power supply circuit 70 includes the two stabilization circuits 71b and 72b. The stabilization circuit 71b supplies the constant voltage to the temperature sensor 21. The stabilization circuit 72b supplies the constant voltage to the temperature sensor 22.

As described above, since at least a part of the power supply circuit 70 is separated, the influence of noise via the power supply circuit 270 can be suppressed. Specifically, since the power supply circuit 270 is separated at output portions of the stabilization circuit 72b and the stabilization circuit 71b, the switch noise caused by the AD converter 52 and returning to the stabilization circuits 72b and 71b to sneak into the temperature sensor 21 is sufficiently reduced. Therefore, it is possible to maintain a stable and clean output voltage with little noise superimposed on a signal outputted from the first temperature sensor unit 11.

In addition, in the power supply circuit 270 according to the present modification, the voltage source 70a is shared. Therefore, the circuit scale and size of the IC element 220 can be reduced. Further, since an output reference of the temperature sensor 21 and an output reference of the temperature sensor 22 are common, it is possible to easily match outputs from the respective temperature sensors.

Second Modification

Figure 7:
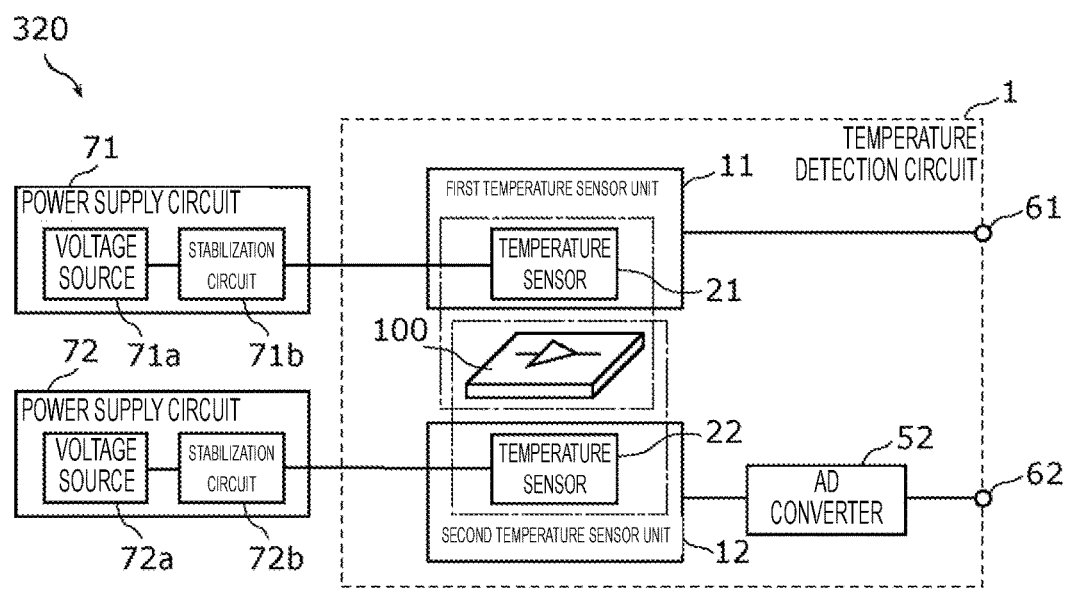
FIG. 7 is a block diagram illustrating a specific configuration of an IC element according to a second modification of the embodiment.

Next, an IC element according to a second modification will be described with reference to FIG. 7. FIG. 7 is a block diagram illustrating a specific configuration of an IC element 320 according to the present modification.

As illustrated in FIG. 7, the IC element 320 includes two power supply circuits 71 and 72 instead of the power supply circuit 70, as compared with the IC element 120 according to the embodiment. Each of the two power supply circuits 71 and 72 has the same configuration as that of the power supply circuit 70.

Specifically, the power supply circuit 71 includes a voltage source 71a and the stabilization circuit 71b. The power supply circuit 72 includes a voltage source 72a and the stabilization circuit 72b. The voltage source 71a and the voltage source 72a have the same configuration and generate a voltage having the same magnitude. As with the first modification, the stabilization circuit 71b and the stabilization circuit 72b have the same configuration as each other, and generate constant voltages having the same magnitude as each other. That is, the IC element 320 according to the present modification differs from the IC element 220 according to the first modification in that the voltage sources are also provided separately, that is, the power supply circuits are completely separated from each other.

As described above, the transmission/reception module according to the present modification includes the two power supply circuits 71 and 72. The power supply circuit 71 supplies the constant voltage to the temperature sensor 21. The power supply circuit 72 supplies the constant voltage to the temperature sensor 22.

As a result, the power supply circuit 71 connected to the temperature sensor 21 and the power supply circuit 72 connected to the temperature sensor 22 are separated from each other, and thus it is possible to further reduce the influence of noise via the power supply circuit 70.

Others

Although the temperature detection circuit and the module according to the present disclosure have been described above based on the above-described embodiment and the modifications thereof, the present disclosure is not limited to the above-described embodiment.

For example, although an example in which the IC element 120 includes the temperature detection circuit 1 and the RF amplifier unit 126 has been described in the above-described embodiment, the IC element 120 may include the temperature detection circuit 1 and the PA unit 132. That is, the PA unit 132 and the temperature detection circuit 1 may be formed into an integrated circuit in the same IC element.

Further, for example, the transmission/reception module 100 may not include the RF amplifier unit 126 or the PA unit 132. For example, the transmission/reception module 100 may be a module being exclusive for transmission and configured to process a transmission signal without including the RF amplifier unit 126. Alternatively, the transmission/reception module 100 may be a module being exclusive for reception and configured to process a reception signal without including the PA unit 132.

Further, for example, the temperature detection circuit 1 may not be provided in the transmission/reception module 100. Specifically, the target object to be detected by the temperature detection circuit 1 may not be the PA unit 132 or the RF amplifier unit 126 provided in the transmission/reception module 100. For example, the target object may be liquid or gas, and the temperature detection circuit 1 may be used for a fluid sensor. The temperature detection circuit 1 may not be modularized, and for example, the first temperature sensor unit 11 and the second temperature sensor unit 12 may be attachable to and detachable from the target object.

In addition, forms obtained by performing various modifications conceived by a person skilled in the art on the embodiment, and forms implemented by arbitrarily combining the constituent elements and the functions in the embodiment without departing from the spirit and scope of the present disclosure are also included in the present disclosure.

INDUSTRIAL APPLICABILITY

The present disclosure can be used as a temperature detection circuit or the like capable of detecting a temperature with high accuracy, and can be widely used for detecting a temperature of a communication device such as a mobile phone, as a radio frequency module disposed in a multi-band compatible front-end unit, or temperatures of other household appliances or apparatuses, for example.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A temperature detection circuit comprising:
   a first temperature sensor unit that includes a first temperature sensor configured to detect a first temperature of the target object and that is configured to output a first analog signal indicating the first temperature of the target object;
   a first output port configured to receive the first analog signal from the first temperature sensor and output the first analog signal representing an analog temperature value for the target object;
   a second temperature sensor unit that includes a second temperature sensor configured to detect a second temperature of the target object and that is configured to output a second analog signal indicating the second temperature of the target object, the second temperature sensor being different from the first temperature sensor;
   an analogue digital (AD) converter configured to convert the second analog signal into a digital signal and to output the digital signal indicating the second temperature of the target object; and
   a second output port configured to receive the first analog signal from the AD converter and output the digital signal representing a digital temperature value of the target object that is independent of the analog temperature value.

2. The temperature detection circuit according to claim 1, wherein
   the first temperature sensor unit further includes:
      a first amplification unit configured to amplify a signal outputted from the first temperature sensor and output the amplified signal as the first analog signal,
      a first reference voltage generation circuit configured to generate a first reference voltage that is supplied to the first amplification unit, and
      a first resistance connected to the first amplification unit, and
   the second temperature sensor unit further includes:
      a second amplification unit configured to amplify a signal outputted from the second temperature sensor and output the amplified signal as the second analog signal to the AD converter, a second reference voltage generation circuit configured to generate a second reference voltage to be supplied to the second amplification unit, and
a second resistance connected to the second amplification unit.

3. A module comprising:
the temperature detection circuit according to claim 2; and
a power supply circuit configured to supply a constant voltage to the temperature detection circuit.

4. The module according to claim 3, wherein
the power supply circuit includes:
a voltage source, and
a stabilization circuit configured to generate the constant voltage by stabilizing a voltage outputted from the voltage source.

5. The module according to claim 4, further comprising:
a first integrated circuit (IC) element, wherein
the temperature detection circuit is provided in the first IC element.

6. The module according to claim 3, comprising:
two power supply circuits, wherein:
one of the two power supply circuits supplies the constant voltage to the first temperature sensor, and
the other of the two power supply circuits supplies the constant voltage to the second temperature sensor.

7. The module according to claim 6, further comprising:
a first integrated circuit (IC) element, wherein
the temperature detection circuit is provided in the first IC element.

8. The module according to claim 3, further comprising:
a first integrated circuit (IC) element, wherein
the temperature detection circuit is provided in the first IC element.

9. A module comprising:
the temperature detection circuit according to claim 1; and
a power supply circuit configured to supply a constant voltage to the temperature detection circuit.

10. The module according to claim 9, wherein
the power supply circuit includes:
a voltage source, and
a stabilization circuit configured to generate the constant voltage by stabilizing a voltage outputted from the voltage source.

11. The module according to claim 10, wherein
the power supply circuit includes two stabilization circuits, wherein:
one of the two stabilization circuits supplies the constant voltage to the first temperature sensor, and
the other of the two stabilization circuits supplies the constant voltage to the second temperature sensor.

12. The module according to claim 11, further comprising:
a first integrated circuit (IC) element, wherein
the temperature detection circuit is provided in the first IC element.

13. The module according to claim 10, comprising:
two power supply circuits, wherein:
one of the two power supply circuits supplies the constant voltage to the first temperature sensor, and
the other of the two power supply circuits supplies the constant voltage to the second temperature sensor.

14. The module according to claim 9, comprising:
two power supply circuits, wherein:
one of the two power supply circuits supplies the constant voltage to the first temperature sensor, and
the other of the two power supply circuits supplies the constant voltage to the second temperature sensor.

15. The module according to claim 14, further comprising:
a first integrated circuit (IC) element, wherein
the temperature detection circuit is provided in the first IC element.

16. The module according to claim 9, further comprising:
a first integrated circuit (IC) element, wherein
the temperature detection circuit is provided in the first IC element.

17. The module according to claim 10, further comprising:
a first integrated circuit (IC) element, wherein
the temperature detection circuit is provided in the first IC element.

18. A module comprising:
a temperature detection circuit comprising:
a first temperature sensor unit that includes a first temperature sensor configured to detect a temperature of a target object and that is configured to output a first analog signal indicating the temperature of the target object,
a first output port configured to receive the first analog signal from the first temperature sensor and output the first analog signal,
a second temperature sensor unit that includes a second temperature sensor configured to detect the temperature of the target object and that is configured to output a second analog signal indicating the temperature of the target object,
an analogue digital (AD) converter configured to convert the second analog signal into a digital signal and to output the digital signal indicating the temperature of the target object, and
a second output port configured to receive the first analog signal from the AD converter and output the digital signal;
a power supply circuit configured to supply a constant voltage to the temperature detection circuit and
a first integrated circuit (IC) element, wherein the temperature detection circuit is provided in the first IC element,
wherein the first IC element further includes:
an antenna switch connected to an antenna, and
a low-noise amplifier connected to the antenna switch and configured to amplify a reception signal received by the antenna.

19. The module according to claim 18, further comprising:
an amplifier connected to the antenna switch and configured to amplify a transmission signal transmitted by the antenna.

20. The module according to claim 19, further comprising:
a second IC element, wherein
the amplifier is provided in the second IC element.

* * * * *